United States Patent [19]

Suckewer

[11] Patent Number: 4,704,718

[45] Date of Patent: Nov. 3, 1987

[54] APPARATUS AND METHOD FOR GENERATING SOFT X-RAY LASING ACTION IN A CONFINED PLASMA COLUMN THROUGH THE USE OF A PICOSECOND LASER

[75] Inventor: Szymon Suckewer, Princeton Junction, N.J.

[73] Assignee: Princeton University, Princeton, N.J.

[21] Appl. No.: 794,133

[22] Filed: Nov. 1, 1985

[51] Int. Cl.$^4$ ............................................. H01S 3/30
[52] U.S. Cl. ......................................... 372/5; 372/37; 372/76
[58] Field of Search ............................... 372/37, 5, 76

[56] References Cited

U.S. PATENT DOCUMENTS 4,058,486 11/1977 Mallozzi et al. .................... 250/493
4,201,955 5/1980 Elton et al. ............................ 372/69

OTHER PUBLICATIONS

Szymon Suckewer et al.; "Population Inversion and Gain Measurements for Soft X-ray Laser Development in a Magnetically Confined Plasma Column"; IEEE Journal of Quantum Electronics, vol. QE-19, No. 12, Dec. 1983.

A. L. Hoffman and E. A. Crawford; "Laser Heating and Ionization of Magnetically Confined Plasmas in the Presence of Strong UV and X Radiation"; J. Appl. Phys. 49(6), Jun. 1978.

MacPherson, "X-ray Laser"; Oct. 30, 1984, p. 24; The Star-Ledger.

Bishop, "Researchers Say X-ray Laser is near, Promising Medical, Scientific Benefits"; Oct. 30, 1984; p. 12; The Wall Street Journal.

Browne, "Star Wars' Science Expected to Spawn Peaceful Inventions"; Apr. 2, 1985; pp. C1-C2; The New York Times.

Primary Examiner—James W. Davie
Assistant Examiner—Bertha Randolph
Attorney, Agent, or Firm—Richard C. Woodbridge

[57] ABSTRACT

Soft X-ray lasing action may be obtained by focusing a high power, picosecond laser pulse on a confined plasma column. The plasma column is created by focusing a $CO_2$ laser pulse on a target such as carbon. A strong cylindrical magnetic field contains the plasma and causes it to assume the shape of a column. While the plasma column is cooling rapidly due to radiation losses, a second high power laser with a duration time of approximately 1 picosecond is focused along the central part of the plasma column. The powerful picosecond laser provides strong selective excitation of the ions for enhancement population inversion and the creation of high gain for X-ray lasing action. According to alternative embodiments, other multi-Z elements such as molybdenum, aluminum and krypton can be used to create a lasing medium in the plasma column.

17 Claims, 8 Drawing Figures

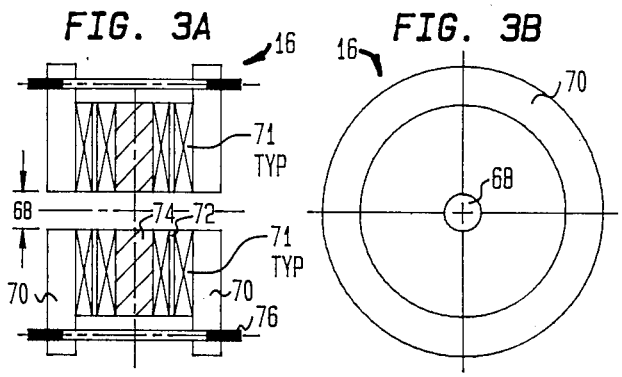
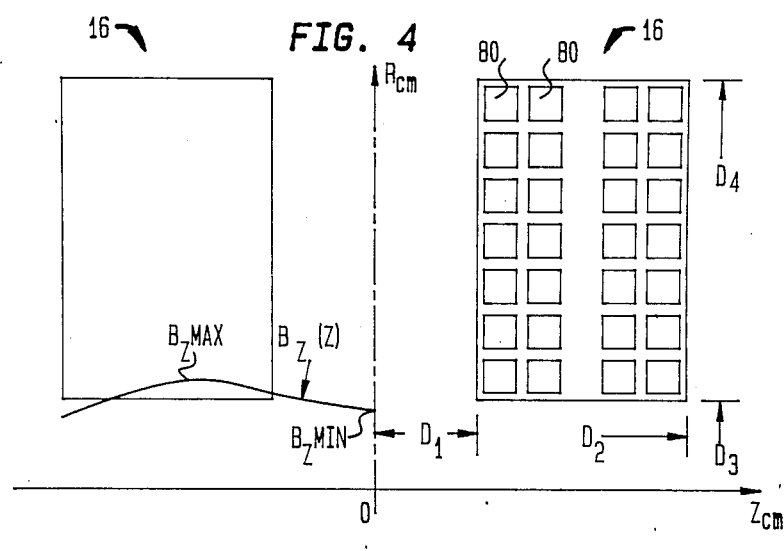

APPARATUS AND METHOD FOR GENERATING SOFT X-RAY LASING ACTION IN A CONFINED PLASMA COLUMN THROUGH THE USE OF A PICOSECOND LASER

BACKGROUND OF THE INVENTION

1. Field of the Invention

The invention comprises a method and apparatus for generating soft X-ray lasing action by focusing a powerful picosecond laser on a confined plasma column.

2. Description of the Prior Art

Soft X-ray lasers have gained recent attention because of the interesting scientific potential for such devices. It is believed that X-ray lasers would have the capability of forming holographic interference images which could, for example, be used to study the detailed three-dimensional structure of small molecules such as DNA. Other significant applications are anticipated. The potential for X-ray lasers is described in the Oct. 30, 1984 editions of THE NEWARK STAR LEDGER and THE WALL STREET JOURNAL, as well as the Apr. 2, 1985 edition of THE NEW YORK TIMES.

New technology has made it possible to create very powerful excimer lasers having pulse duration times in the neighborhood of 1 picosecond and powers in the neighborhood of $10^{15}$–$10^{17}$ W/cm$^2$ and above. Since high power excimer lasers have only recently been possible, there isn't much in the way of prior art that appears relevant to the concept. Of some interest in U.S. Pat. No. 4,058,486 entitled PRODUCING X-RAYS which discusses the formation of a plasma by a low power precursor pulse which is followed up by a subseqent higher power main pulse with the object of creating X-rays from the interaction. A variety of low-Z and high-Z materials are described as potential laser targets. The use of multi-Z plasmas is also discussed in U.S. Pat. No. 4,201,955 in a different laser environment. According to an alternative embodiment of the present invention the CO$_2$ laser could be replaced by a neodymium glass laser. The use of Nd:G glass lasers is discussed in a different environment in U.S. Pat. No. 4,058,486. Also of possible interest is a publication entitled "Soft X-Ray Pumping of Metastable Levels of Li Plus", Appl. Phys. Lett. 42(1) Jan. 1, 1985, 9–11. While the foregoing devices may have some relevance to the present invention, they are not believed to have the capability of producing the significant soft X-ray lasing action of the method and apparatus disclosed herein.

SUMMARY OF THE INVENTION

Briefly described, the invention comprises a method and apparatus for producing soft X-ray lasing action by focusing a powerful picosecond laser beam on a confined plasma column. The plasma column is created and heated by a powerful CO$_2$ laser having a pulse duration in the 10–100 nanosecond range. Carbon fiber is the preferred target although multi-Z elements such as molybdenum; aluminum or krypton could also be used. A strong cylindrical magnetic field confines the plasma to a column 1–2 centimeters long and about 1 millimeter in diameter. After the initial CO$_2$ laser pulse, as the plasma is cooling rapidly due to radiation, a second laser having a pulse time of 1 picosecond and power in the neighborhood of $10^{15}$–$10^{17}$ W/cm$^2$ is focused along the central portion of the column. The effect of the second laser is to provide strong selective excitation of the CVI ions for enhancement of population inversion and the creation of high gain for soft X-ray lasing action. Alternatively the second laser can be used to produce multiphoton excitation of multi-Z ions to create soft X-ray lasing action.

These and other features of the invention will be more fully understood by reference to the following drawings and detailed description of the preferred embodiment.

BRIEF DESCRIPTION OF THE DRAWINGS

FIG. 3A is a cross-sectional view of the helical magnet.

FIG. 3B is an axial view of the helical magnet illustrated in FIG. 3A showing the location of the gap therein.

FIG. 4 illustrates the magnetic field distribution and conductor configuration of the helical magnet.

DETAILED DESCRIPTION OF THE PREFERRED EMBODIMENT

During the course of this description like numbers will be used to identify like elements according to the different figures which illustrate the invention.

Figure 1:
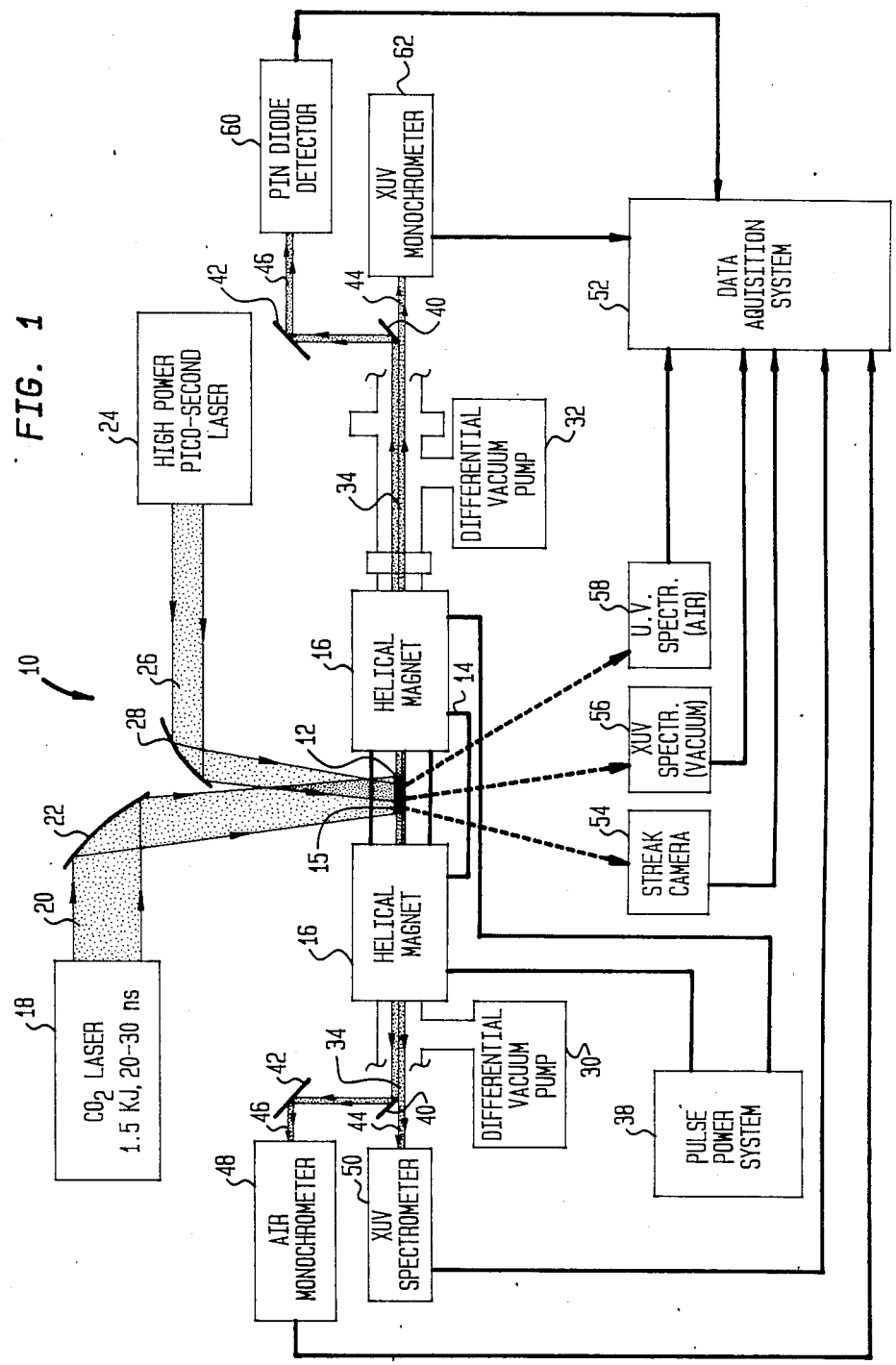
FIG. 1 is a general overall schematic diagram of the preferred embodiment of the invention.

The preferred embodiment of the soft X-ray laser apparatus 10 is illustrated in FIG. 1. A target material 12, such as carbon fiber is housed within a vacuum vessel 14. Alternatively a carbon foil could be employed or a fiber or foil of a multi-Z material. A pair of differential vacuum pumps 30 and 32 bring the vacuum in chamber 14 down to the neighborhood of $10^{-7}$ Torr. A CO$_2$ laser 18 produces a beam 20 focused by mirror 22 on carbon fiber target 12. Beam 20 perferably comprises a pulse having a duration of 20–30 nanoseconds and an energy level of 1.5 KJ. While a pulse duration of 20–30 nanoseconds is preferred, a time scale in the neighborhood of 10–100 nanoseconds would be acceptable. Similarly, while a CO$_2$ laser is preferred other types of lasers such as Nd:Glass laser would also be acceptable. The cross-section of the CO$_2$ laser beam 20 typically has a length approximately the length of the carbon filter target 12 and a width slightly wider than target 12. Therefore for a target 12 1–2 cm long and 35 to 100 microns thick the cross-section of the CO$_2$ laser beam might be 1–2 cm long and 100–200 microns wide. CO$_2$ laser beam 20 creates a plasma which is confined to a column shape by helical magnets 16. The plasma column 15 formed thereby is typically 1–2 centimeters long and about 1 millimeter in diameter. The magnetic field created by the helical magnet 16 has a strength in the neighborhood of 100–150 KGauss. The plasma column 15 confined by the magnetic field $B_z$ cools rapidly by radiation losses and becomes a very good medium for creating relatively high gain in the soft X-ray region of 100–200 Angstroms. It has been found that radiation losses for the plasma column 15 are more efficient for fast cooling than through cooling by adiabatic expansion. It is important that the confined plasma column 15 be relatively long, and uniform along its axis and that it have a higher density than the freely expanding column at the time when the highest population inversion (gain) is expected.

Figure 2:
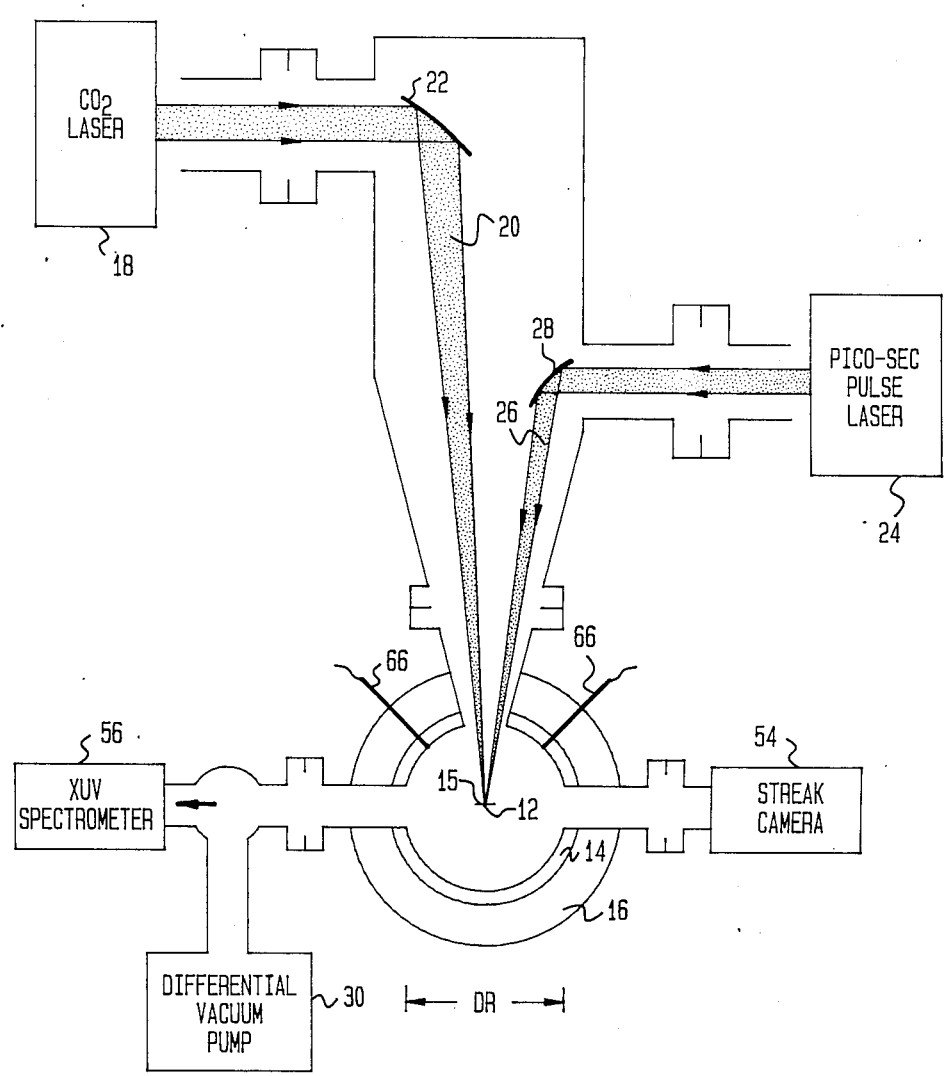
FIG. 2 is a detail view of the reaction chamber portion of the preferred embodiment illustrated in FIG. 1.

Shortly after the plasma column 15 is formed by the $CO_2$ laser beam 20, the plasma column 15 is subjected to a high power picosecond laser pulse 26. Laser pulse 26 is created by high power picosecond laser 24 and focused by mirror 28 onto the plasma column 15. The high power picosecond pulse 26 is focused on the plasma column 15 approximately 20 to 100 nanoseconds after the $CO_2$ laser pulse 20 has created the plasma column 15. High power laser pulse 26 has a pulse duration time of approximately 1 picosecond and a power output in the range of $10^{15}$–$10^{17}$ W/cm². The powerful picosecond laser beam 26 is smaller in cross-section than $CO_2$ laser beam 20 and is focused along the central part of the plasma column 15 which is approximately 50 micrometers in diameter. Power for the helical magnet 16 is provided by a pulsed power system 38. Laser beams 20 and 26 are strongly focused in one direction as shown in FIG. 2 and slightly focused in the other perpendicular direction as shown in FIG. 1. Therefore laser beams 20 and 26 can be accurately described as line focused beams since they are focused along the length of the target 12 in order to created an elongated plasma column 15 with small radial dimensions. Both beams 20 and 26 are near-perpendicular to plasma column 15 as can be appreciated from FIG. 2.

A variety of instruments are used to monitor the total radiation beam 34 from the apparatus 10. On one side the beam 34 shown in FIG. 1 is divided by beam splitter mirror 40 into two beams 44 and 46. Beam 44 is analyzed by XUV spectrometer 50 (X-ray part of the beam) whereas beam 46 is reflected by mirror 42 into air monochrometer 48 (UV part of the beam). The outputs from the air monochrometer 48 and XUV spectrometer 50 provide some of the inputs to data acquisition system circuit 52. Another portion of the beam 34 passes to another beam splitter 40 where a portion of the beam 44 is monitored by XUV monochrometer 62 (X-ray part of the beam). The other portion of the beam 46 is reflected off mirror 42 into Pin diode detector 60 (UV part of the beam). The outputs of Pin diode detector 60 and the XUV monochrometer 62 are likewise forwarded to data acquisition system 52. A streak camera 54, a vacuum XUV spectrometer 56, and an air UV spectrometer 58 also monitor the conditions inside of vacuum vessel 14 and forward the data to data acquisition system 52.

FIG. 2 is a detail mechanical illustration of the vacuum vessel 14 and the associated elements which are shown more generally in FIG. 1. Optical fiber probes 66 are directed towards the target area 12 where the plasma column 15 is formed. The output from optical probes 66 forms the input for the streak camera 54. The vacuum XUX spectrometer 56 and the air UX spectrometer 58 and other instruments are connected to vacuum chamber 14 of apparatus 10 and can be arranged to view the plasma 15 through a system of conventional mirrors and lenses as well as through optical fibers 66. The diameter DR of the vacuum vessel 14 is preferably in the neighborhood of 5 centimeters.

FIGS. 3A, 3B and 4 all illustrate various aspects of the helical magnet 16. FIG. 3A is a cross-sectional view of the helical solenoid magnet 16. Magnet 16 includes a core aperture 68 having a diameter DR in the neighborhood of 5 centimeters as previously described. A pair of end plates 70 held together by tie rod 76 support the windings 71. Power is supplied to windings 71 by the pulse power system 38 illustrated in FIG. 1. Windings 71 create a strong magnetic field having a strength of approximately B=100 KGauss. However, magnetic fields with strengths in the neighborhood of B=150 to 200 KGauss are also contemplated. Because windings 71 generate a great deal of heat they are cooled by water cooled platens 72 and water cooled spacers 74. FIG. 3B is an end view of the helical solenoid magnet 16 illustrated in FIG. 3A. The left hand portion of FIG. 4 illustrates the relative magnitude of the magetic field $B_z$ with respect to the long axis $Z_{cm}$ of the apparatus 10. The magnitude of the field $B_z$ is greatest near the center of the helical magnet 16 ($B_zMAX=180$ KGauss) and lowest near the portion where the plasma column is formed at $Z_{cm}=0$ ($B_zMIN=140$ KGauss). The right hand portion of FIG. 4 shows the location of the conductors 80 that form parts of the winding 71 illustrated in FIG. 3A. The right hand side of FIG. 4 also shows the preferred dimensional relationship between the helical magnetic section 16 and the radial axis $R_{cm}$ and the longitudinal axis $Z_{cm}$. Those preferred dimensions are as follows:

$D_1 = 2.5$ centimeters
$D_2 = 7.6$ centimeters
$D_3 = 2.5$ centimeters
$D_4 = 10.0$ centimeters The dimensions $D_3$ is equal to 2.5 centimeters which is one-half of the width of gap 68 which has a diameter $DR = 5.0$ centimeters.

Figure 5:
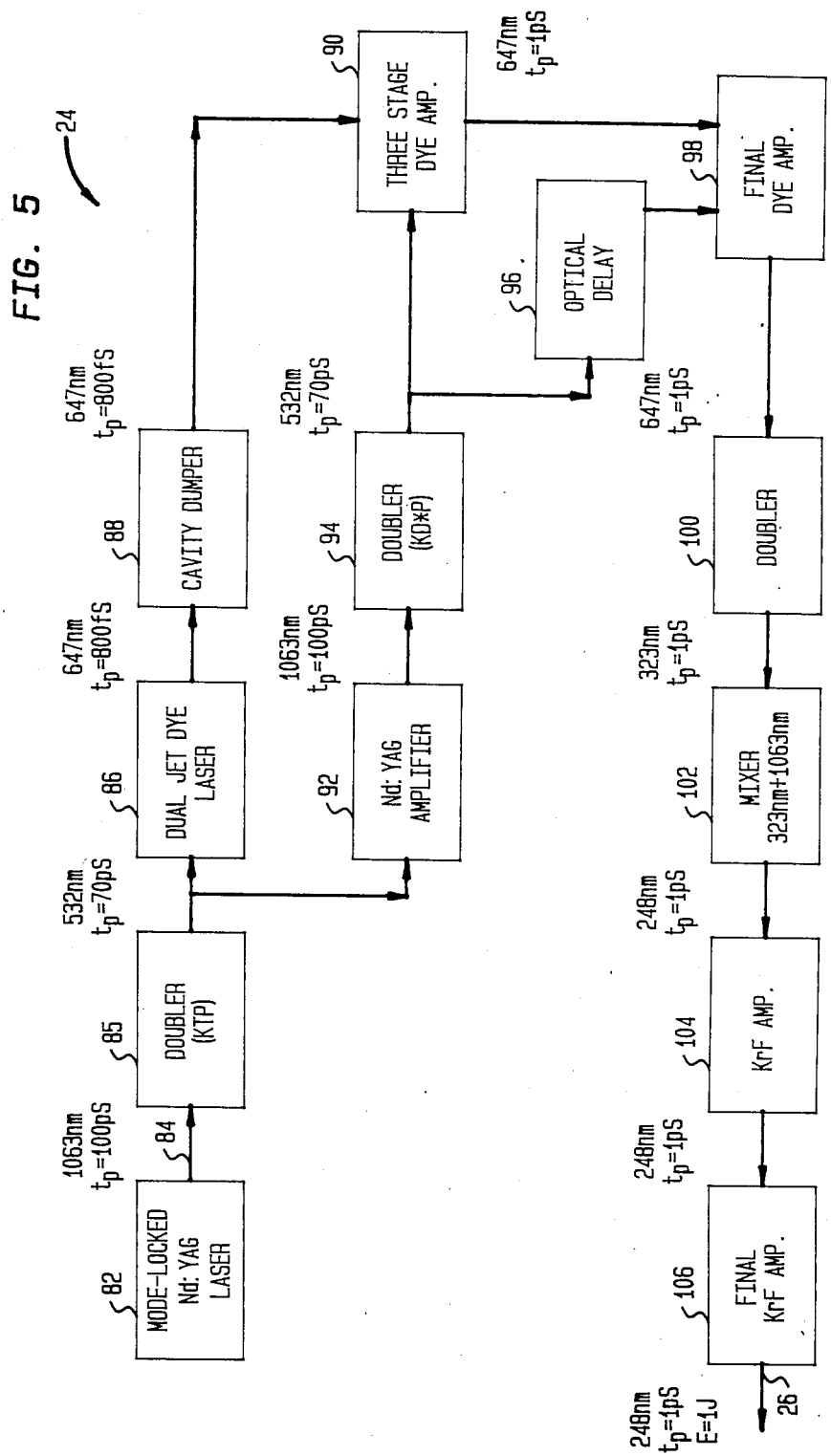
FIG. 5 is a schematic diagram of the powerful picosecond laser.

FIG. 5 illustrates in schematic fashion the details of the powerful picosecond laser 24. Picosecond laser 24 is typical of the type of lasers that can now be constructed. There are other techniques that could be used as well. This particular technique is offered only to show the preferred embodiment for use with this invention and is not meant to limit the scope of other powerful picosecond lasers that could be used as well. Initially a mode locked Nd:YAG laser 82 produces an output 84. The output 84 goes to a KTP doubler 85 whose output is split and forms the input to a dual jet dye laser 86 and an Nd:YAG amplifier 92. The output from the dual jet dye laser 86 forms input to cavity dumper 88 the output of which forms the input to a three stage dye amplifier 90. Similarly the output from Nd:YAG amplifier 92 passes throug a KD*P doubler 94 which pumps the three stage dye amplifier 90. The output of the KD*P doubler 94 is optically delayed by device 96 to correlate with the peak gain of the final dye amplifier 98 for which it provides pumping input. The output from the three stage dye amplifier 90 is the input for final dye amplifier 98. The output from final dye amplifier 98 is doubled in doubler crystal 100 and forwarded to mixer crystal 102. The output from mixer crystal 102 forms the input to preliminary KrF amplifier 104 which feeds the final KrF amplifier 106. The laser output 84 from the mode lock Nd:YAG laser 82 originally had a pulse duration of $t_p = 100$ picoseconds and a wavelength of 1063 nm. The apparatus 24 converted that output to a powerful picosecond laser beam 26 having a pulse width of $t_p = 1$ picosecond and a wavelength of 248 nm. The output energy of the powerful picosecond laser burst 26 is in the neighborhood of $E = 1$ J. The elements just described which form part of the powerful picosecond laser apparatus 24 are conventional elements and, the method and apparatus for forming the powerful picosecond laser output 26 are believed to be within the abilities of one of ordinary skill in the art.

Figure 6:
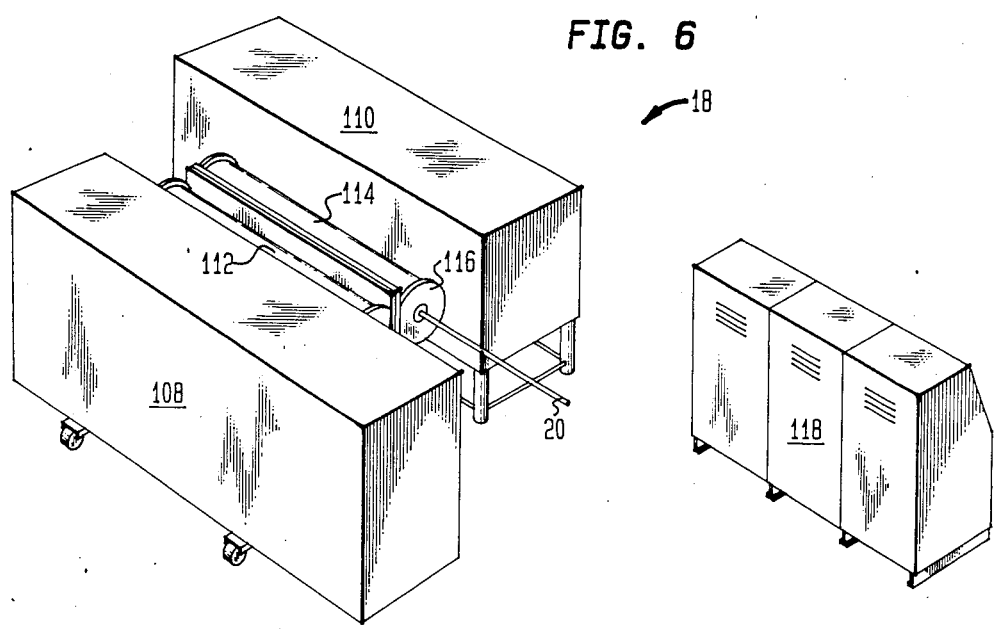
FIG. 6 illustrates in perspective view the elements of the CO$_2$ laser.

Likewise, the $CO_2$ laser 18 illustrated in FIG. 6 is believed to be generally conventional. The elements of the $CO_2$ laser 18 can, for example, be purchased inidvidually from Maxwell Laboratory Inc., 8888 Bell Bowa Avenue, San Diego, Calif. 92128. Typically a Marx generator 108 provides the initial power for the E-beam chamber 112. Sustainer bank oil tank 110 contains high voltage elements to provide a high voltage discharge in laser chamber 114. The electron beam formed in E-beam chamber 112 passes through laser chamber 114 for initiation discharge in laser chamber 114. The discharge in laser chamber 114 creates lasing action and the resulting $CO_2$ laser beam 20 is subsequently focused by optical system 116. The $CO_2$ beam 20 is shown schematically as it is emitted from the optical system 116. It preferably has a pulse width tp of 20 to 30 nanoseconds and an energy level of 1.5 KJ. While the powerful picosecond laser 24 illustrated in FIG. 5 and the lower power $CO_2$ laser 18 illustrated in FIG. 6 have been described in sufficient detail for one of the ordinary skill in the art to make and use lasers 18 and 24, it will be appreciated that a detailed understanding of their operation structure. is not necessary for an understanding of the overall method and apparatus of the preferred embodiment of the invention 10.

In operation a target 12, such as carbon is placed in the vacuum vessel 14 which is then evacuated. $CO_2$ laser 18 is then activated causing laser beam 20 to impinge upon carbon target 12. The 1.5 Kjoule, 20-30 nanosecond pulse causes the carbon target 12 to ionize. The powerful helical solenoid magnets 16 forms a magnetic field having a strength of B=100 KGauss which causes the plasma to assume the shape of a column 15 having a length of 1-2 centimeters and a diameter of approximately 1 millimeter. Approximately 20-100 nanoseconds after laser beam 20 has created the plasma column 15, it is subjected to the powerful picosecond laser beam 26 which has a pulse duration $t_p$ of approximately 1 picosecond and power in the neighborhood of $10^{15}$–$10^{17}$ W/cm². Powerful picosecond laser beam 26 is focused along the central part of the plasma column which is approximately 50 micrometers in diameter. In general prior art efforts have been directed towards the interaction of powerful lasers with cold gas or solid targets. In contrast to the prior art approach, the present invention 10 comprehends interacting a very powerful picosecond laser with a plasma column. The unique plasma column 15 formed according to the present invention 10 has very favorable conditions for population inversion and gain due to its fast radiation cooling. Hence a significantly increased population inversion by fast selective excitation and ionization of ions by multiphoton processes induced by powerful picosecond laser leads to high gain and lasing action.

Figure 7:
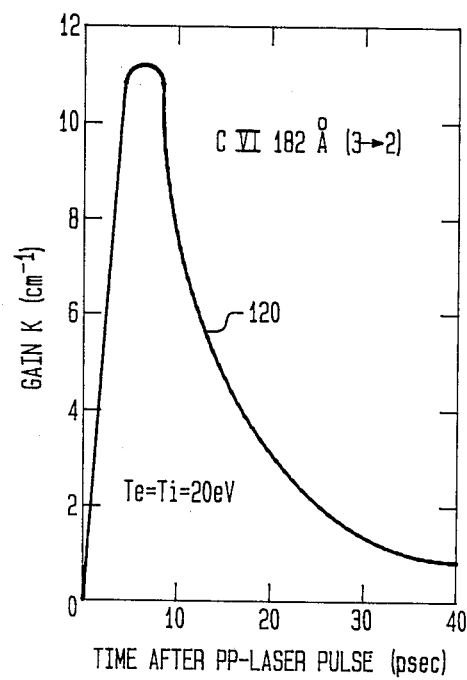
FIG. 7 illustrates the gain for a 182 Angstrom line created by the interaction of the powerful picosecond laser of FIG. 5 with CVI ions in a plasma column as created by the CO$_2$ laser in FIG. 6.

FIG. 7 illustrates the nature of the output pulse 120 which occurs with the interaction of the powerful picosecond laser pulse 26 with CVI ions in a confined plasma column 15. A maximum gain of approximately 11 measured in terms of K(cm$^{-1}$) is shown approximately 7 picoseconds after the powerful picosecond laser pulse 26. Soft X-ray laser beam 120 has a wavelength of 182 Angstroms. While the output laser beam 120 is shown in the soft X-ray lasing range of 100-200 Angstroms, it is likely that higher gains can also be produced creating wavelengths in the shorter 60-70 Angstrom region using the other than carbon target (e.g. higher Z materials). Moreover, theoretical modelling suggests that it is possible to predict and produce lasing action in the 10-20 Angstrom range using the same general method and apparatus but using more powerful lasers and high-Z materials as targets.

The following table gives the preferred value of selected parameters of the invention 10 along with approximate ranges for producing acceptable results.

TABLE OF VALUES

| PARAMETER | PREFERRED VALUE | APPROXIMATE RANGE |
|---|---|---|
| $D_1$ | 2.5 cm | 2-3 cm |
| $D_2$ | 7.6 cm | 6-8 cm |
| $D_3$ | 2.5 cm | 2-3 cm |
| $D_4$ | 10.0 cm | 5-15 cm |
| DR | 5.0 cm | 4-6 cm |
| Laser 18 Energy | 1.5K J | 1-2K J |
| Laser 18 Power | 50 GW | 40-80 GW |
| Laser 18 Pulse FWHM | 20-30 nanosecond | 10-100 nsecond |
| Laser 26 Energy | 1 J | 0.5-2 J |
| Laser 26 Power | 1000 GW | 500-2000 GW |
| Laser 26 Power Density | $10^{16}$ W/cm² | $10^{15}$–$10^{17}$ W/cm² |
| Laser 26 Pulse FWHM | 1 picosecond | 1-2 picoseconds |
| Time between Laser Pulses 18 & 26 | 50 nsecond | 20-100 nsecond |
| Plasma column length | 1.5 cm | 1-2 cm |
| Plasma column diameter | 1 mm | 0.5-1.5 cm |
| Plasma column electron density | $10^{19}$ cm$^{-3}$ | $10^{19}$–$10^{20}$ cm$^{-3}$ |
| Plasma column ion density | $1.5 \times 10^{18}$ cm$^{-3}$ | $1.5 \times 10^{18}$–$10^{19}$ cm$^{-3}$ |
| Plasma column temperature during lasing action | 20 eV | 10-50 eV |
| Target 12 | Carbon | O, Ne, Ar, Al, Si, Kr, Mo |
| Strength of Magnetic Field | B = 100 KGauss | 100-200 KGauss |
| Vacuum in Pressure Vessle 14 | $10^{-7}$ Torr | $10^{-6}$–$10^{-8}$ Torr |

While the preferred embodiment of the invention relates to the use of a carbon target 12, it will be appreciated that large population inversions are also possible in multi-electron high-Z ions as well as in H- and Li-like ions of low-Z elements. For picosecond laser powers in excess of $10^{15}$ to $10^{17}$ W/cm² an increase in gain by selective population of the level n=3 in CVI and OVII is expected. Similar results are anticipatable for Li-like ions NeVIII, AlXI and SiXII to increase the gain at wavelengths of 292 Angstroms, 157 Angstroms and 130 Angstroms respectively. Even better results are anticipated for the interaction of a powerful picosecond laser 26 with multielectron ions in a recombining plasma column. Present information indicates that a powerful picosecond laser 26 with an energy level less than $10^{15}$ W/cm² can ionize multielectron atoms (e.g. Ar, Kr, Xe, U) much more effectively than atoms with a few electrons (e.g. H, He, C). It is possible to create a recombining plasma column consisting of, for example, Ar VIII ions (or for example, Kr VIII or Kr IX ions) which can be excited by a powerful picosecond laser 26. Multiphoton ionization of Ar, Kr, Xe, U up to ArVII, KrVII, XeIX and UXI has already been observed. It is therefore believed possible to create a very high gain in the region of 100-200 Angstroms by the interaction of a powerful picosecond laser 26 near resonant multiphoton excitation frequencies of Ar VIII as well as Kr VIII or Kr IX.

One of the problems with prior art approaches is that efforts were made to interact powerful lasers with cold gases. Under those circumstances the laser first had to ionize the atoms to he proper stage of ionization and then generate a large population inversion. However, according to the method and apparatus of the present invention, if the ions of the proper stage of ionization can be created independently (i.e. by the $CO_2$ laser beam 20) then the role of the powerful picosecond laser beam 26 is simplified to providing the high population inversion. Doppler line broadening in a plasma is significantly larger than in a cold gas. However, in a cold gas the gain is also limited by Stark line broadening, and this can be comparable to Doppler broadening in a recombining plasma.

While the invention has been described with reference to the preferred embodiment thereof it will be appreciated that various changes can be made to the method and parts of the apparatus without departing from the spirit and scope of the invention as a whole.

I claim:

1. An apparatus for generating soft X-ray lasing action comprising:
    a target;
    first laser means for producing a first laser beam for interacting with said target and for generating a plasma having ions therein;
    magnetic field means for confining said plasma and shaping it substantially into the form of a column;
    second laser means for producing a second laser beam having a pulse duration less than 2 picoseconds and a power in excess of $10^{15}$ w/cm$^2$ for interacting with said plasma column to provide strong selective excitation of said ions to create population inversion and gain for soft X-ray lasing action.

2. The apparatus of claim 1 wherein the pulse duration of said second laser beam is approximately in the range of 1–2 picoseconds.

3. The apparatus of claim 1 wherein said first laser beam has a pulse duration in the range of 10 to 100 nanoseconds.

4. The apparatus of claim 1 further including: control means for controlling said second laser means so that said second laser beam interacts with said plasma column between 20 and 100 nanoseconds after said plasma was generated by said first laser beam.

5. The apparatus of claim 1 wherein said magnetic field means creates a magnetic field having a strength of approximately B=100 KGauss.

6. The apparatus of claim 5 wherein said plasma column is approximately 1 millimeter in diameter.

7. The apparatus of claim 6 wherein said ions in said plasma column at least one member selected from the group consisting of C, O and Ne.

8. The apparatus of claim 6 wherein said ions in said plasma column comprise at least one member selected from the group consisting of Al, Si, Ar, Kr and Mo.

9. The apparatus of claim 6 wherein said first laser means comprising a $CO_2$ laser.

10. The apparatus of claim 7 wherein said ions comprise ions of carbon.

11. A method for generating soft X-ray lasing action comprising the steps of:
    generating a first laser beam;
    creating a plasma having ions therein by impinging said first laser beam on a target;
    generating a magnetic field to confine said plasma and shape said plasma substantially into the form of a column;
    generating a second laser beam having a pulse duration less than 2 picoseconds and power in excess of $10^{15}$ W/cm$^2$; and,
    interacting said second laser beam with said plasma column to provide strong selective excitation of said ions to create population inversion and gain for soft X-ray lasing action.

12. The method of claim 11 further comprising the step of:
    cooling said plasma column by radiation cooling prior to the step of interacting said second laser beam with said plasma column.

13. The method of claim 12 wherein said first laser beam has a pulse duration in the range of 10 to 100 nanoseconds and a power of approximately 1.5 KJoules.

14. The method of claim 11 wherein said ions are formed from material comprising at least one member selected from the group consisting of C, O, and Ne.

15. The method of claim 11 wherein said ions are formed from material comprising at least one member selected from the group consisting of Al, Si, Ar, Kr and Mo.

16. The method of claim 11 wherein said first laser beam is generated by a $CO_2$ laser.

17. The method of claim 16 wherein said ions are carbon ions.

* * * * *

UNITED STATES PATENT AND TRADEMARK OFFICE
CERTIFICATE OF CORRECTION

Page 1 of 2

PATENT NO. : 4,704,718
DATED : November 3, 1987
INVENTOR(S) : Szymon Suckewer

It is certified that error appears in the above—identified patent and that said Letters Patent are hereby corrected as shown below:

Column 1, insert the following before " BACKGROUND OF INVENTION "

-- ### LICENSE RIGHTS

This invention was made with Government support under Basic Energy Sciences Grant No. KC-05-01 awarded by The Department of Energy. The government has certain rights in the invention. invention. --.

On col. 1, line 11 correct "picoseond" to --picosecond--;

On col. 5, line 34, correct "strangth" to --strength--;

On col. 6 in the TABLE of VALUES change lines 33 & 34  $1.5 \times 10^{18} \, cm^{-3}$ to  $1.5 \times 10^{18} \times cm^{-3}$ and lines 33 & 34  $1.5 \times 10^{18}-10^{19} \, cm^{-3}$ to

UNITED STATES PATENT AND TRADEMARK OFFICE
CERTIFICATE OF CORRECTION

PATENT NO. : 4,704,718

DATED : November 3, 1987

INVENTOR(S) : Szymon Suckewer

It is certified that error appears in the above-identified patent and that said Letters Patent is hereby corrected as shown below:

-- $1.5 \times 10^{18}\text{-}10^{19} \text{ cm}^{-3}$ --.

Signed and Sealed this

Second Day of August, 1988

Attest:

DONALD J. QUIGG

Attesting Officer

Commissioner of Patents and Trademarks